United States Patent
Cook (10) Patent No.: US 7,634,554 B2
(45) Date of Patent: Dec. 15, 2009

(54) TTL EXPLORATION TECHNIQUE FOR DETERMINING CAPABILITIES AND CONFIGURATION OF A PEER ROUTER

(75) Inventor: David Anthony Cook, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 818 days.

(21) Appl. No.: 10/665,805

(22) Filed: Sep. 18, 2003

(65) Prior Publication Data

US 2005/0076114 A1   Apr. 7, 2005

(51) Int. Cl.
G06F 15/177 (2006.01)
G06F 15/173 (2006.01)

(52) U.S. Cl. .................... 709/221; 709/238
(58) Field of Classification Search ............ 709/238, 709/221–224
See application file for complete search history.

(56) References Cited

U.S. PATENT DOCUMENTS

| 5,109,483 | A | 4/1992 | Baratz et al. | |
|---|---|---|---|---|
| 6,269,099 | B1 | 7/2001 | Borella et al. | |
| 6,373,854 | B1 | 4/2002 | Lee | |
| 6,553,423 | B1 | 4/2003 | Chen | |
| 7,139,242 | B2 * | 11/2006 | Bays | 370/238 |
| 7,139,838 | B1 * | 11/2006 | Squire et al. | 709/242 |
| 2001/0050943 | A1 | 12/2001 | Mahany | |
| 2003/0140166 | A1 * | 7/2003 | Harvey et al. | 709/238 |
| 2003/0140167 | A1 * | 7/2003 | Harvey et al. | 709/238 |
| 2004/0034702 | A1 * | 2/2004 | He | 709/224 |
| 2004/0039840 | A1 * | 2/2004 | Dispensa et al. | 709/242 |

OTHER PUBLICATIONS http://www.ietf.org/internet-drafts/draft-ietf-idr-bgp4-cap-neg-03.txt, "Capabilities Negotiation with BGP-3", posted Feb. 1999, pp. 1-4.

Tony Bates, et al., World Wide Web page http://www/search.ietf.org/internet-drafts/draft-ietf-bgp4-multiprotocol-v2-02.txt, "Multiprotocol Extensions for BGP-4", posted Feb. 1999, pp. 1-10.

Tanenbaum, Andrew S., "Computer Networks" Third Edition; Chapter 6, Section 4 The Internet Transport Protocols (TCP and UDP); Prentice Hall PTR, 1996, New Jersey, pp. 521-542.

Perlman, Radia, "Interconnections: Bridges and Routers" Addison-Wesley Professional Computing Series, 1992, Reading, Massachusetts, pp. 323-329.

http://www.potaroo.net/ietf/ids/draft-gill-btsh-02.txt, "The BGP TTL Security Hack (BTSH)", posted May 2003, pp. 1-8.

(Continued)

*Primary Examiner*—Yemane Mesfin
(74) *Attorney, Agent, or Firm*—Cesari and McKenna, LLP (57) ABSTRACT

An exploration technique allows a router to efficiently determine capabilities and configuration of a neighbor (peer) router. In addition, the technique enables peer routers of an adjacency to negotiate a capability "outside" of a protocol, such as a routing protocol, before a routing session is established between the routers. In this context, the term "outside" of the protocol denotes that there is no field within a protocol packet (message) implementation that can be used to negotiate the capability. Moreover, the inventive technique obviates the need to manually configure a router to support a particular capability and interoperate correctly within a network of routers that both support and are unaware of the capability.

15 Claims, 5 Drawing Sheets

OTHER PUBLICATIONS

Rekhter at al, <draft-ietf-idr-bgp4-20.txt> "A Border Gateway Protocol 4 (BGP-4)", Apr. 2003 pp. 1-85.

Rekhter at al., "A Border Gateway Protocol 4 (BGP-4)", Mar. 1995, pp. 1-57 RFC 1771.

http://www.cisco.com/un d/cc/t...s120/12cgcr/np1_c/1cprtl/1cbgp.htm, "Configuring BGP" copyright 1989-1999 pp. 1-44.

"Notification of Transmittal of the International Search Report and the Written Opinion of the International Searching Authority, or the Declaration" for International Application No. PCT/US2004/030224 with an International Filing Date of Sep. 16, 2004.

"Written Opinion of the International Searching Authority" of International Application No. PCT/US2004/030224 with an International Filing date of Sep. 16, 2004.

R. Chandra et al. "Capabilities Advertisement with BGP-4" Request for Comments 2842, May 2000.

Vijay Gill et al. "The BGP TTL Security Hack (BTSH) <draft-gill-gtsh-02.txt.", Internet Draft: http://www.watersprings.org/pub/id/draft-gilltbtsh-02.txt, May 2003 Expires Nov. 2003.

Vijay Gill et al., "The Generalized TTL Security Hack (GTSH) <draft-gill-gtsh-00.txt>" Internet Draft: http://www.watersprings.org/pub/id/draft-gill-gtsh-00.txt, Aug. 2003 Expires Feb. 2004.

* cited by examiner

TTL EXPLORATION TECHNIQUE FOR DETERMINING CAPABILITIES AND CONFIGURATION OF A PEER ROUTER

FIELD OF THE INVENTION

The invention relates generally to computer networks and, more particularly, to efficiently discovering capabilities of routers during a peer establishment process of a routing protocol executing on the routers.

BACKGROUND OF THE INVENTION

A computer network is a geographically distributed collection of interconnected communication links and subnetworks (subnets) used to transport data between nodes, such as computers. Many types of computer networks are available, with the types ranging from local area networks (LANs) to wide area networks (WANs). The nodes typically communicate by exchanging discrete packets or messages of data according to pre-defined protocols, such as the Transmission Control Protocol/Internet Protocol (TCP/IP). In this context, a protocol consists of a set of rules defining how the nodes interact with each other. The TCP/IP architecture is well known and described in *Computer Networks, 3rd Edition*, by Andrew S. Tanenbaum, published by Prentice-Hall (1996).

Computer networks may be further interconnected by an intermediate node, such as a router, to extend the effective "size" of each network. Since management of a large system of interconnected computer networks can prove burdensome, smaller groups of computer networks may be maintained as autonomous systems or routing domains. The networks within a routing domain are typically coupled together by conventional "intra-domain" routers. Yet is still may be desirable to increase the number of nodes capable of exchanging data; in this case, interdomain routers executing interdomain routing protocols are used to interconnect nodes of the various autonomous systems.

An example of an interdomain routing protocol is the Border Gateway Protocol version 4 (BGP-4), which performs routing between autonomous systems by exchanging routing and reachability information among neighboring interdomain routers of the systems. The BGP-4 routing protocol is well known and described in detail in *Request For Comments (RFC)* 1771, by Y. Rekhter and T. Li (1995), *Internet Draft <draft-ietf-idr-bgp4-20.txt>* titled, *A Border Gateway Protocol 4 (BGP-4)* by Y. Rekhter and T. Li (April 2003) and *Interconnections, Bridges and Routers*, by R. Perlman, published by Addison Wesley Publishing Company, at pages 323-329 (1992), all disclosures of which are hereby incorporated by reference.

The interdomain routers configured to execute the BGP-4 protocol, referred to herein as BGP routers, perform various routing functions including transmission of routing messages. An adjacency is a relationship formed between selected neighboring (peer) routers for the purpose of exchanging routing messages and abstracting the Network topology. Before transmitting such messages, however, the BGP peers cooperate to establish a logical "peer" connection (session) between the routers. BGP-4 operates over a TCP connection, a reliable transport protocol. A TCP process executing on each peer router establishes the TCP connection in accordance with a conventional "3-way hand-shake" arrangement involving the exchange of TCP packet or segment data structures. The TCP protocol and establishment of a TCP connection are described in *Computer Networks, 3rd Edition*, particularly at pgs. 521-542, which is hereby incorporated by reference as though fully set forth herein.

Figure 1:
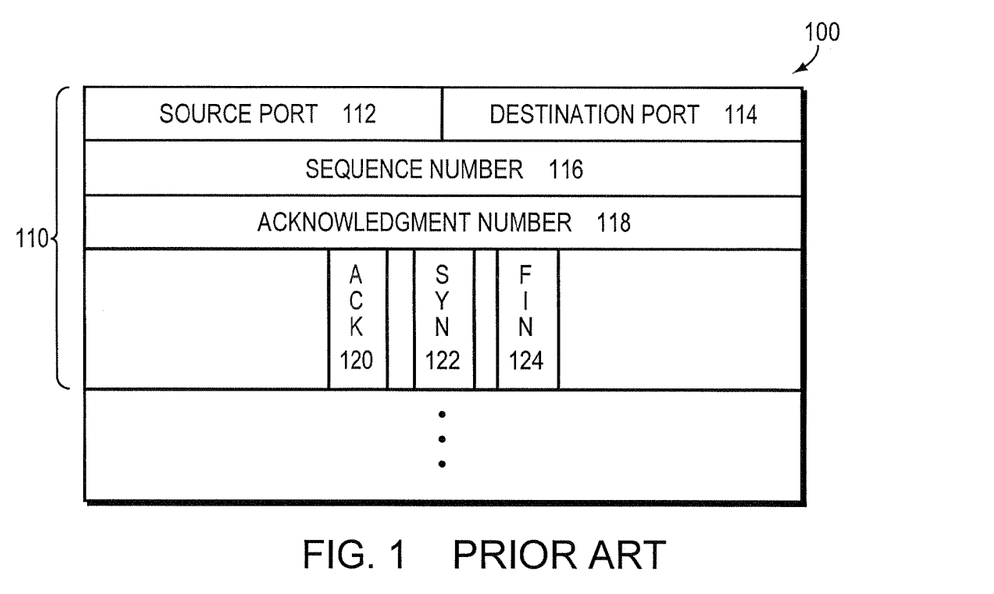
FIG. 1 is a partial schematic block diagram of the format of a Transmission Control Protocol (TCP) segment used to establish a TCP connection between peer routers of a computer network.

FIG. 1 is a partial schematic block diagram of the format of a TCP segment 100. The TCP segment comprises a TCP header 110 that includes a source port field 112 containing a 16-bit source port number and a destination port field 114 containing a 16-bit destination port number. The source port number is used by a receiving peer router (i.e., a BGP receiver) to reply to a TCP segment 100 issued by a sending peer router (i.e., a BGP sender). A sequence number field 116 contains a sequence number of a first data byte in the segment and an acknowledgement number field 118 contains a value indicating the next sequence number that the receiver expects to receive. Note that the value contained in field 118 is valid only when an acknowledgement control bit (ACK 120) is asserted. In addition to the ACK bit 120, the TCP segment 110 includes other control bits, such as a synchronize bit (SYN 122) and a finish bit (FIN 124), the latter denoting the end of data transmitted from the sender. Termination (closing) of the TCP connection is done explicitly by sending a TCP segment with an asserted FIN bit 124.

To establish a TCP connection, the TCP processes on the peer routers must synchronize on each other's initial sequence numbers. This is done in an exchange of connection establishing segments carrying the SYN 122 control bit and the initial sequence numbers 116. Synchronization requires each peer router to send its own initial sequence number and to receive a confirmation (acknowledgement) from the other peer router according to the 3-way handshake arrangement. The resulting TCP connection is identified by the port numbers contained in fields 112,114 and IP addresses of the peer routers. The IP addresses are contained in an IP header of the segment.

Figure 2:
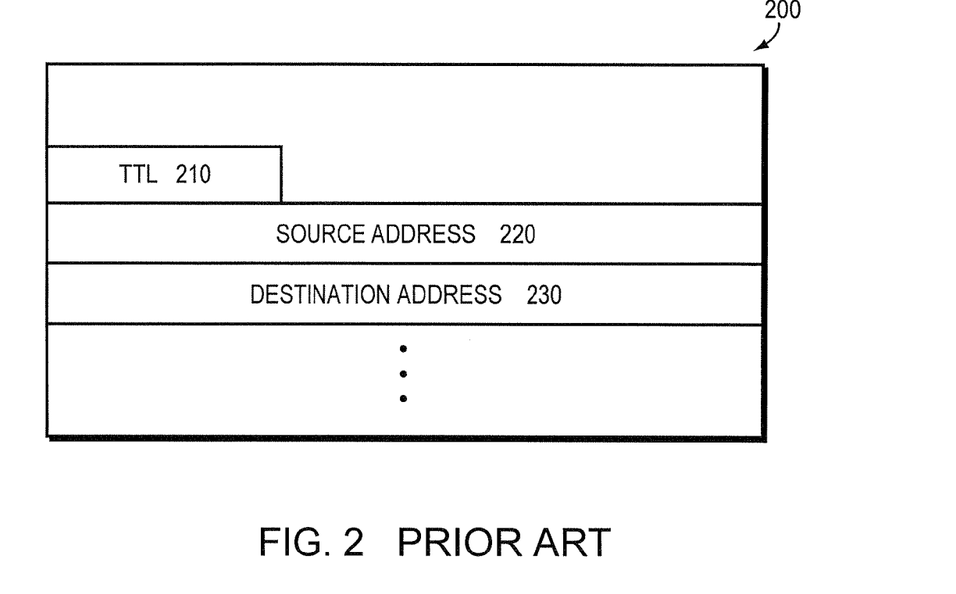
FIG. 2 is a partial schematic diagram of the format of an Internet Protocol header that may be advantageously used with the present invention.

FIG. 2 is a partial schematic diagram of the format of an IP header 200 comprising, inter alia, a source address field 220 containing the IP source address of the sending entity (e.g., the sending or initiating peer router) and a destination address field 230 containing the IP destination address of the receiving entity (e.g., the receiving peer router). In addition, the IP header 200 includes an 8-bit time-to-live (TTL) field 210 that contains a parameter indicating a maximum time the segment (or message) is allowed to remain in the network. For many routing protocols, including protocols that run over unreliable transports or implement reliable transports other than TCP, the TTL parameter is set to 1 in the routing message. This implies that the neighbor is on the same subnet and that there is only one "hop" distance between the peer routers.

BGP routers typically transmit BGP messages with a TTL of 1 for all directly connected peers. For all incoming BGP messages, the TTL can then be checked to ensure that it is 0. That is, if a BGP router is communicating with a routing peer and the TTL of the message is set to 1, the TTL should be 0 (or 1) when it gets to the router because the message should not have traversed more than one router to other subnets. Note that the TTL is not always set to one for BGP, as the adjacency can span multiple "hops" (for multi-hop BGP). In that latter case, the TTL is set at 2, 3 or whatever the multiple hop count.

One problem is that an attack may be launched against the BGP router from several hops away to, e.g., overload the router with more data than it can handle. Often an authentication process on the router performs authentication (such as MD5 or IP-SEC) operations to ensure that the data it receives from its peer is correct. In the case of the BGP routing process, the TCP process authenticates the TCP header of a message. However, these authentication operations require extra processing and, thus, consume router resources, such as a central processor unit (CPU).

While it does protect invalid data from being sent, such extra processing exposes the router to further attacks by, e.g., allowing an attacker to send "bogus" messages. The authentication process is forced to authenticate these messages and discard them when they fail authentication. Yet, if the attacker sends the router more information than it can handle, the attacker may achieve its desired effect of forcing the router to reboot. That is, the bogus data message overload forces the router to reboot so that the attacker can penetrate the router or just disrupt service. In addition, the router may perform filtering operations to make sure that the TTL of a routing protocol message is 1 or 0 (and not some other value). Such filtering allows that router to quickly discard bogus messages, as it is easier to examine the value of the TTL field than having to do an encryption-type of authentication operation on the message to determine whether it is bogus.

However, an attacker from outside the subnet can send messages that the router will accept by, e.g., setting the TTL to a value consistent with the number of hops away it is from the router. The TTL field is decremented by one at each router that forwards the message. When the message arrives on that subnet/link, it looks like it originated on that link. In other words, the message received at the router will have the same TTL (e.g., one) as every other message originated by routers on that link. Thus, if an attacker is able to determine how many hops away it is from the router, it can successfully launch an attack against the router. The attacker may also spoof the source address in the IP header of the message so that it looks as if the message originated on the destination local subnet.

A solution to this problem is to set the TTL parameter to a high value, e.g., 254, in accordance with a BGP TTL Security Hack (BTSH). BTSH is well known and described in detail in *Internet Draft <draft-gill-btsh-02.txt>* titled, *The BGP TTL Security Hack (BTSH)* by V. Gill et al. (May 2003), which is hereby incorporated by reference as though fully set forth herein. BTSH is designed to protect the BGP [RFC 1771] infrastructure from CPU-utilization based attacks and, to that end, provides a procedure for protecting BGP routers from the attackers. For example, in the case of directly connected routers, the BTSH procedure specifies setting the TCP TTL for the BGP connection to a value in the range of 255-254.

When a routing peer receives the routing message, it checks the TTL field to ensure that, instead of a value of 0 or 1, the TTL value is not less than 254. This ensures that the message originated on the same subnet as the router and hasn't been forwarded from another subnet. This is similar to sending a message with a TTL of 1 and making sure that it is 0 at the receiving peer. Here, the TTL is sent with a value of 255 and the routing peer ensures that the value is 254 when received.

It is generally accepted that it is more secure to use BTSH (and a TTL of 255) for transmitted BGP routing messages. Accordingly, it is desirable that incoming BGP messages received at a BGP router have a TTL of 254 for directly connected peers. Attacks on the BGP router would likely have originated on the link that connects the peers in order to have a TTL of 254. If an attacker attacks a router from outside the subnet, it is difficult (if not impossible) to direct messages to the router with a TTL value of 254 because the maximum value of the TTL parameter that can be set by the attacker is 255. When the message is forwarded with that value from outside the subnet, it will have a value less than 254 when arriving at the router.

Multi-hop BGP can use the same method described above by only accepting messages with a TTL of 253 or less, with the value of the TTL parameter corresponding to the number of hops between BGP peers. Therefore, the router can be configured to discard (not accept) a message because of the TTL value. This solution greatly restricts where attacks on a router can originate; for example, such an attack may need to be launched from a site local to the subnet/link, which is generally difficult to achieve because the attacker has to be geographically in the general area as the router.

A problem with this solution involves upgrading the routers to support BTSH.

One way to upgrade a router is by "manual" configuration using, e.g., a conventional configuration command. Not only does the router require such manual configuration, but the router's peer(s) must also be configured to support BTSH at the same time. In particular, router configuration to support BTSH for BGP sessions generally occurs on a per-peer basis. Configuring the BTSH option on potentially thousands of peering sessions is time consuming and increases the possibility of configuration mismatches that prevent establishment of peering sessions. It is also difficult to coordinate the upgrade at the same time on both routers that are peers. A technique is thus needed to automatically detect whether a peer supports and is using the BTSH option.

Another way to upgrade is through a capabilities exchange between peer routers.

For example once a TCP connection is established, BGP peer routers exchange messages to open and confirm various parameters associated with the connection. An initial message exchanged by the BGP routers is an OPEN message that opens a BGP communication session between the peers. After the OPEN messages are exchanged, KEEPALIVE messages are issued periodically by a BGP router to notify its peer router that it is "alive" and active. The OPEN message data structure is essentially a means for the routers to identify themselves at the beginning of the neighboring peer relationship. The formats and functions of the KEEPALIVE and OPEN messages are described in RFC 1771 and *Internet Draft <draft-ietf-idr-bgp4-20.txt>*.

In a typical capabilities exchange, a session must be established before any negotiation of capabilities ensues. For example since BGP runs over TCP, a TCP session has to be established before any routing protocol capabilities can be negotiated. It is generally difficult to negotiate a routing protocol capability, such as a TTL parameter, "within" the routing protocol after a session is established, because the session (procedure) has progressed too far. In this context, the term "within" a routing protocol denotes that there is a field ("behavior") within the routing protocol message (packet) implementation that can be used. A technique "outside" of a routing protocol is thus needed to enable efficient capabilities negotiation before the routing protocol peering session is initiated.

SUMMARY OF THE INVENTION

The present invention overcomes the disadvantages of the prior art by providing an exploration technique that allows a router to efficiently determine capabilities and configuration of a neighbor (peer) router. In addition, the technique enables peer routers of an adjacency to negotiate a capability "outside" of a protocol, such as a routing protocol, before a routing session is established between the routers. In this context, the term "outside" of the protocol denotes that there is no field within a protocol packet (message) implementation that can be used to negotiate the capability. Moreover, the inventive technique obviates the need to manually configure a router to support a particular capability and interoperate correctly within a network of routers that both support and are unaware of the capability.

Broadly stated, the inventive technique allows the (initiating or receiving) router to automatically determine which capability mode of operation the peer router supports by sending an initial message that includes a first predetermined value of the capability or noting the capability value in a message initiated by the peer router. In the case of session initiation, if the router receives a positive acknowledgement of the initial message from the peer router, it determines that the peer router supports exchanges of messages using a new capability mode of operation. However, if the router receives a negative acknowledgement, or no acknowledgement, of the initial message from the peer router, it decides that the peer router does not support the new capability mode of operation. The initiating router then "switches" to an old capability mode of operation by resending the initial message with a second predetermined value of the capability.

In the illustrative embodiment, the routers are configured to execute the Border Gateway Protocol version 4 (BGP) routing protocol and the capability is a time-to-live (TTL) parameter. In addition, the first predetermined value of the TTL parameter capability is defined by the BGP TTL Security Hack (BTSH). Specifically, the initiating router automatically determines which TTL mode of operation the peer router supports by sending an initial BGP message with a TTL of 255 and then waits for a response from the peer router. If this message is received and positively acknowledged, the initiating router determines that the peer router supports exchanges of messages using the new BTSH mode and the security benefit of sending a TTL of 255 is automatically realized.

However, if the initiating router receives a negative acknowledgement (or does not receive a response at all within a predetermined time), it decides that the peer router has not been upgraded to a new BTSH mode of operation and switches to normal mode, i.e., by resending the initial message (and subsequent messages) with the second predetermined value of the TTL equal 1. More specifically, the router reinitiates session/adjacency establishment with the normal mode of operation using a TTL of 1 or a value equal to the number of hops (in the case of BGP multi-hop). The inventive technique thus allows interoperation among old and new mode router implementations without additional configuration.

Thereafter in response to an upgrade to the new BTSH mode of operation, the peer router reboots, causing the existing session to be destroyed. The router that attempts to establish the new session initially sends one or more messages having a TTL of 255. Since both routers are now upgraded without any manual configuration, the peer router recognizes that the messages having a TTL of 255 conform to the BTSH mode and it responds with messages having a TTL of 255. Subsequently, both routers communicate using messages with a TTL of 255. Each BTSH supported router can then build a security structure, such as an access list, or utilize a process to deny messages/packets with a TTL less than 254 (or other value).

Advantageously, the TTL exploration technique allows BTSH-supported routers to determine whether their peer routers have compatible TTL capabilities "by default", i.e., without negotiation. Otherwise, each router would have to be manually configured to support BTSH on a per-peer, per-routing protocol configuration level. Manual configuration represents significant overhead, requiring consumption of substantial administration time and effort. The present invention avoids such manual configuration and further allows BTSH supported routers to "automatically" interoperate. In addition, the inventive technique obviates any changes, such as state machine changes, to current protocol specification that enable interoperability among peer routers configured for the old and new implementation modes.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 3:
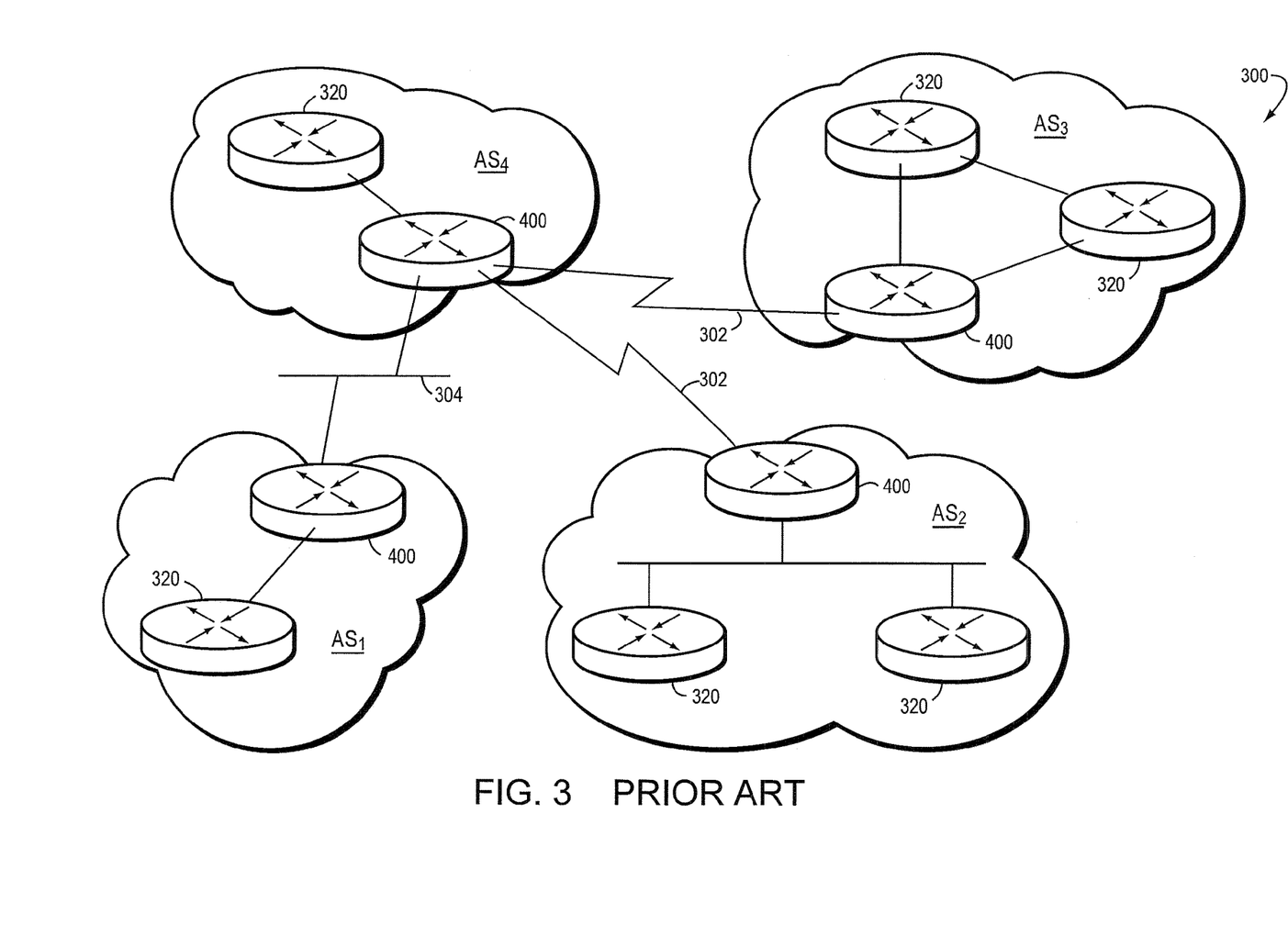
FIG. 3 is a schematic block diagram of a computer network comprising a plurality of autonomous systems interconnected by intermediate nodes, such as Border Gateway Protocol (BGP) interdomain routers.

FIG. 3 is a schematic block diagram of a computer network 300 comprising a plurality of autonomous systems or routing domains interconnected by intermediate nodes, such as conventional intradomain routers 320 and interdomain routers 400. The autonomous systems may include various routing domains ($AS_{1-4}$) interconnected by the interdomain routers. The interdomain routers 400 are further interconnected by shared medium networks, such as local area networks (LANs) 304 and point-to-point links 302, such as frame relay links, asynchronous transfer mode links or other serial links. Communication among the routers is typically effected by exchanging discrete data packets or messages in accordance with pre-defined protocols, such as the Transmission Control Protocol/Internet Protocol (TCP/IP). It will be understood to those skilled in the art that other protocols, such as the Internet Packet Exchange (IPX) protocol, may be advantageously used with the present invention.

Figure 4:
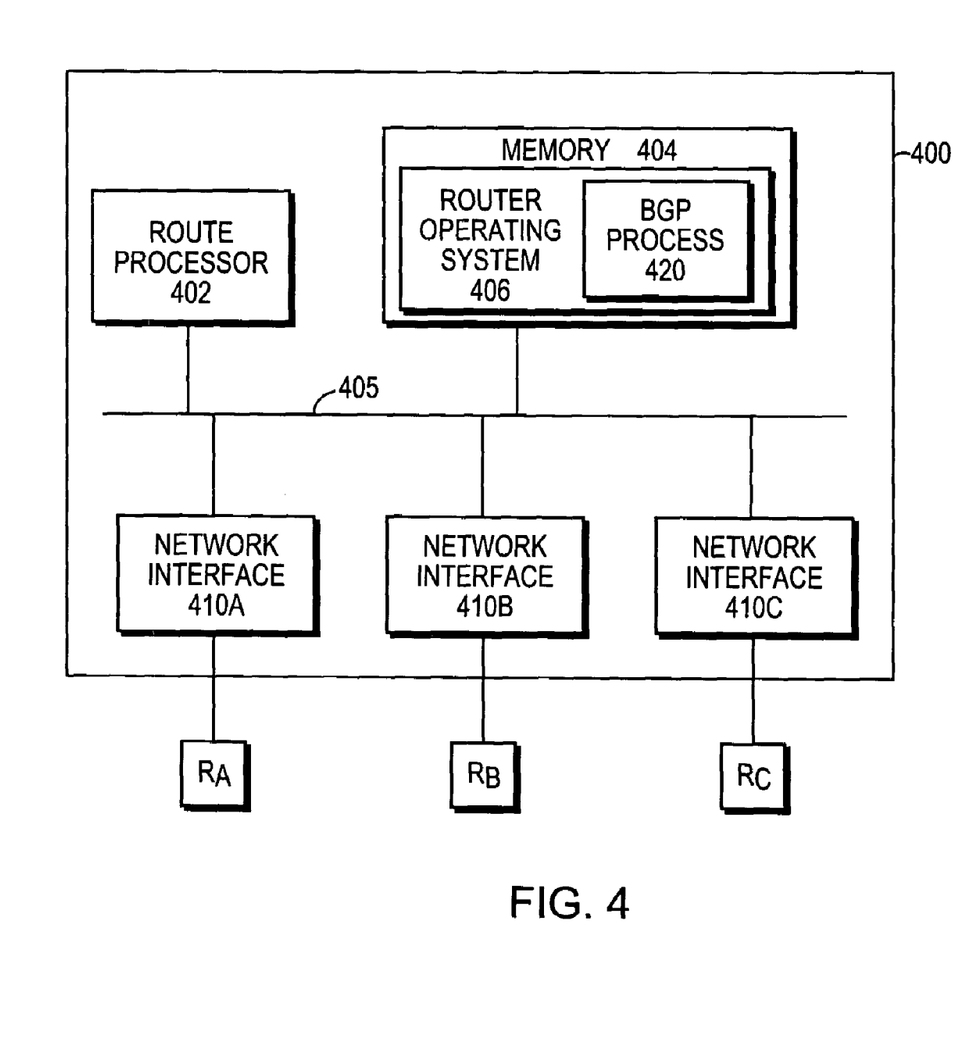
FIG. 4 is a schematic block diagram of an embodiment of an interdomain router comprising a route processor coupled to a memory and a plurality of network interfaces.

Each router typically comprises a plurality of interconnected elements, such as a processor, a memory and a network interface adapter. FIG. 4 is a schematic block diagram of an interdomain router 400 comprising a route processor 402 coupled to a memory 404 and a plurality of network interface adapters $410_{A-C}$ via a bus 405. Each network interface adapter $410_{A-C}$ is coupled to a corresponding routing domain $R_{A-C}$. The memory 404 may comprise storage locations addressable by the processor and interface adapters for storing software programs and data structures associated with the inventive exploration technique. The route processor 402 may comprise processing elements or logic for executing the software programs and manipulating the data structures. A router operating system 406, portions of which are typically resident in memory 404 and executed by the route processor, functionally organizes the router by, inter alia, invoking network operations in support of software processes executing on the router. It will be apparent to those skilled in the art that other processor and memory means, including various computer readable media, may be used for storing and executing program instructions pertaining to the inventive technique described herein.

Figure 5:
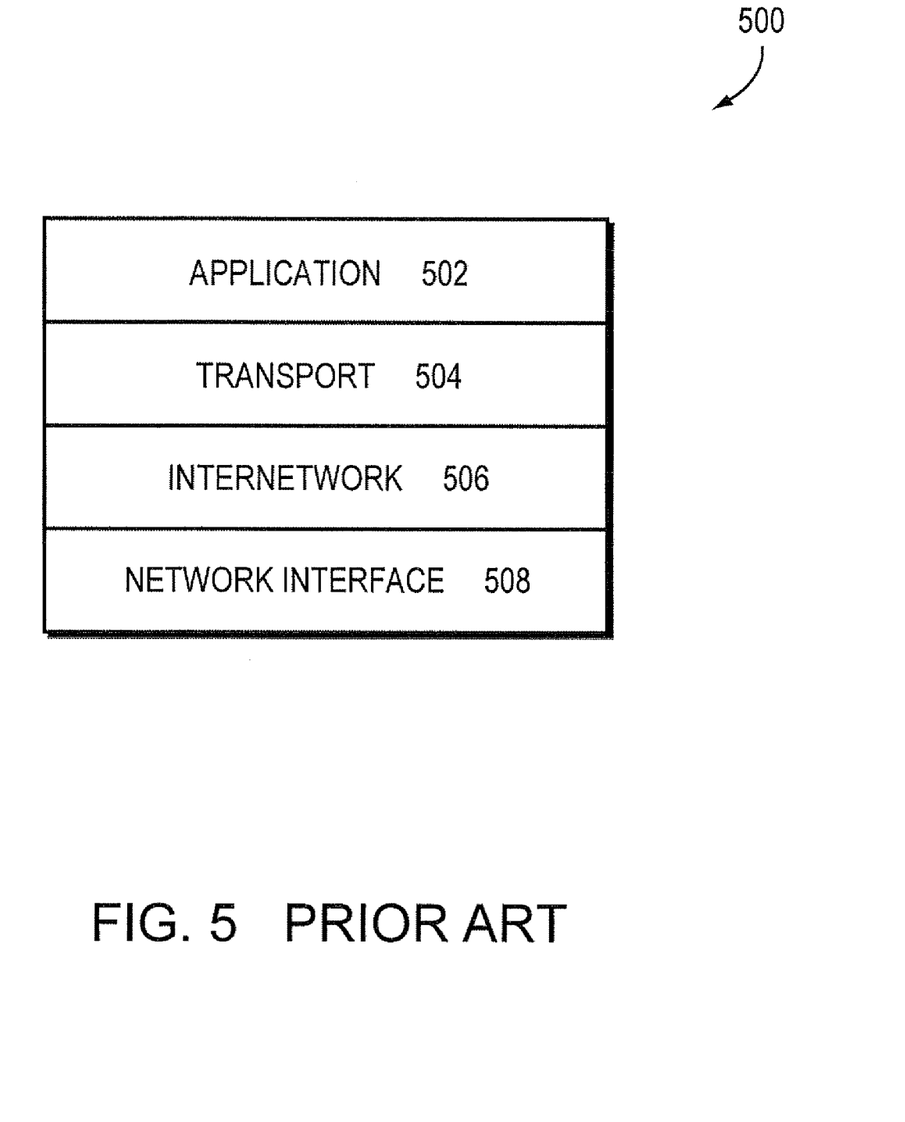
FIG. 5 is a schematic block diagram of a conventional protocol stack, such as the Internet communications protocol stack, within the interdomain router of FIG. 4.

A key function of the interdomain router 400 is determining the next node to which a packet is sent; in order to accomplish such "routing" the interdomain routers cooperate to determine optimal paths through the computer network 300. The routing function is preferably performed by an internetwork layer of a conventional protocol stack within each router. FIG. 5 is a schematic block diagram of a conventional network protocol stack, such as the Internet communications protocol stack 500. The architecture of the Internet protocol stack is represented by 4 layers termed, in ascending interfacing order, the network interface layer 508, the internetwork layer 506, the transport layer 504 and the application layer 502.

The lower network interface layer 508 is generally standardized and implemented in hardware and firmware, whereas the higher layers are typically implemented in the form of software. The primary internetwork layer protocol of the Internet architecture is the Internet Protocol (IP). IP is primarily a connectionless protocol that provides for inter-network routing, fragmentation and reassembly of exchanged packets—generally referred to as "datagrams" in an Internet environment—and which relies of transport protocols for end-to-end reliability. An example of such a transport protocol is the Transmission Control Protocol (TCP), which is implemented by the transport layer 504 and provides connection-oriented services to the upper layer protocols of the Internet architecture. The term TCP/IP is commonly used to denote the Internet architecture.

In particular, the internetwork layer 506 concerns the protocol and algorithms that interdomain routers utilize so that they can cooperate to calculate paths through the computer network 300. An interdomain routing protocol, such as the Border Gateway Protocol (BGP-4), is used to perform interdomain routing (for the internetwork layer) through the computer network. The interdomain routers 400 (hereinafter "peer routers") exchange routing and reachability information among the autonomous systems over a reliable transport layer connection, such as TCP. An adjacency is a relationship formed between selected peer routers for the purpose of exchanging routing messages and abstracting the network topology. The BGP4 protocol is illustratively implemented as a BGP process 420 that "runs" on top of the TCP transport layer 504 to ensure reliable communication of routing messages among the peer routers.

BGP peer routers typically transmit BGP messages with a TTL of 1 for all directly connected (same subnet/link) peers. For all incoming BGP messages, the peer routers can check the TTL value to ensure that it is 0. For multi-hop BGP, the adjacency can span multiple hops and, as a result, the TTL is set to a value of 2, 3 or whatever the multiple hop count. As noted, an attack may be launched against a BGP peer router from several hops away to, e.g., overload the router with more data than it can handle. Here, an attacker can send messages that the router will accept by, e.g., setting the TTL to value consistent with the number of hops away it is from the router. When the message arrives at the router, it appears like it originated on that subnet/link.

A solution to this problem is to set the TTL parameter to a high value, e.g., 254, in accordance with a BGP TTL Security Hack (BTSH). However, upgrading peer routers to support BTSH by "manual" configuration is time consuming and increases the possibility of configuration mismatches that prevent establishment of peering sessions. A technique is thus needed to automatically detect whether a peer supports and is using the BTSH option. In addition, upgrading of peer routers through a capabilities exchange typically requires establishment of a session before any negotiation ensues. A technique outside of a routing protocol is further needed to enable efficient negotiation.

According to the present invention, an exploration technique is provided that allows a router to efficiently determine capabilities and configuration of a peer router. In addition, the technique enables peer routers of an adjacency to negotiate a capability outside of a protocol, such as a routing protocol, before a routing session is established between the routers. In this context, the term "outside" of the protocol denotes that there is no field within a protocol packet (message) implementation that can be used to negotiate the capability. Moreover, the inventive technique obviates the need to manually configure a router to support a particular capability. A router that is upgraded with software pertaining to the novel technique is able to determine if its peer supports that capability.

In the illustrative embodiment, the routers are configured to execute the BGP-4 routing protocol implemented by BGP process 420 and the capability is a TTL parameter.

As described herein, the BGP TTL Security Hack (BTSH) defines a value for the TTL parameter capability. A BGP router supports BTSH via a software update that changes the default behavior of the routing protocol process, such as BGP process 420. This default behavior "automatically" configures the router to attempt to initially establish routing neighbor relationships using messages having a TTL of 255. Note that a high-level protocol, such as BGP, can set the TTL parameter in field 210 of an IP header 200 used in a BGP message. Specifically, the BGP process 420 executing in router 400 initiates a TCP connection with a particular peer router through a socket. A socket may be defined as an endpoint of a TCP connection that includes an IP address and a port number so that the TCP layer 504 can identify the application (or protocol) destined to receive data. The BGP-4 protocol preferably uses port number 179 to establish a TCP connection. The is TCP connection is established by constructing SYN-SYN-ACK segments used in a conventional 3-way TCP handshake arrangement. The BGP process communicates with the TCP process through the socket to specify information that includes, among other things, a TTL parameter value. The BGP process 420 does not, at this point, construct a BGP header for the connection establishing segments; however, the process 420 does initiate construction of those segments.

The TCP process uses the information provided by BGP process 420 to build a TCP header 110 of the segment and initiate the connection by, e.g., informing the IP process to send certain information using the specified TTL. The IP process then constructs an IP header 200 using the TTL parameter for field 210 provided by the BGP process, appends the header 200 to the segment and passes it down the network protocol stack to a media (Ethernet) driver for transmission over the network.

Broadly stated, the inventive technique allows a (initiating or receiving) router to automatically determine which capability mode of operation a peer router supports by sending an initial message that includes the first predetermined value of the capability or noting the capability value in a message initiated by the peer router. In the case of session initiation, if the router receives a positive acknowledgement of the initial message from the peer router, it determines that the peer router supports exchanges of messages using a new capability mode of operation. However, if the router receives a negative acknowledgement of the initial message from the peer router, it decides that the peer router does not support the new capability mode of operation. The initiating router then "switches" to an old capability mode of operation by resending the initial message with a second predetermined value of the capability.

Illustratively, the initiating router automatically determines which TTL mode of operation the peer router supports by sending an initial BGP message with a TTL of 255 and then waits for a response from the peer router. If this message is received and positively acknowledged, the initiating router determines that the peer router supports exchanges of messages using the new BTSH mode and the security benefit of sending a TTL of 255 is automatically realized. However, if the initiating router receives a negative acknowledgement (or does not receive a response at all within a predetermined time), it decides that the peer router has not been upgraded to a new BTSH mode of operation and switches to normal mode, i.e., by resending the initial message (and subsequent messages) with a TTL of 1. More specifically, the router reinitiates session/adjacency establishment with the normal mode of operation using a TTL of, e.g., 1 or a value equal to the number of hops (in the case of BGP multi-hop). The inventive technique thus allows interoperation among old and new mode router implementations without additional configuration.

Thereafter in response to an upgrade to the new BTSH mode of operation, the peer router reboots, causing the existing session to be destroyed. The router that attempts to establish the new session initially sends one or more messages having a TTL of 255. Since both routers are now upgraded without any manual configuration, the peer router recognizes that the messages having a TTL of 255 conform to the BTSH mode and it responds with messages having a TTL of 255. Subsequently, both routers communicate using messages with a TTL of 255. Each BTSH supported router can then build a security structure, such as an access list, or utilize a process to deny messages/packets with a TTL less than 254 (or other value).

A number of embodiments may be used to implement the inventive technique described herein. For example, a routing process (such as BGP process 420) may initiate session/adjacency connection establishment by instructing lower layers of the network protocol stack (e.g., TCP layer 504) to use a TTL of 255. If the connection/session is not established within a predetermined time (no response is received), the routing process is responsible for switching the TTL to normal mode (e.g., one) and re-initiating connection/session establishment. Alternatively, the "intelligence" for determining whether a peer router supports BTSH mode may be implemented in the lower network protocol layers, such as TCP layer 504 or IP layer 506. If implemented in the IP layer, for example, the higher-level routing process informs the IP layer to initially attempt to establish the connection with a TTL of 255 and, if the peer router is not upgraded to support BTSH, switch to a TTL of 1. However, in the illustrative embodiment, the technique is preferably implemented in the higher-level routing protocol capable of returning a negative acknowledgement if it does not support BTSH. This obviates the need to wait for a "time out" condition.

Figure 6:
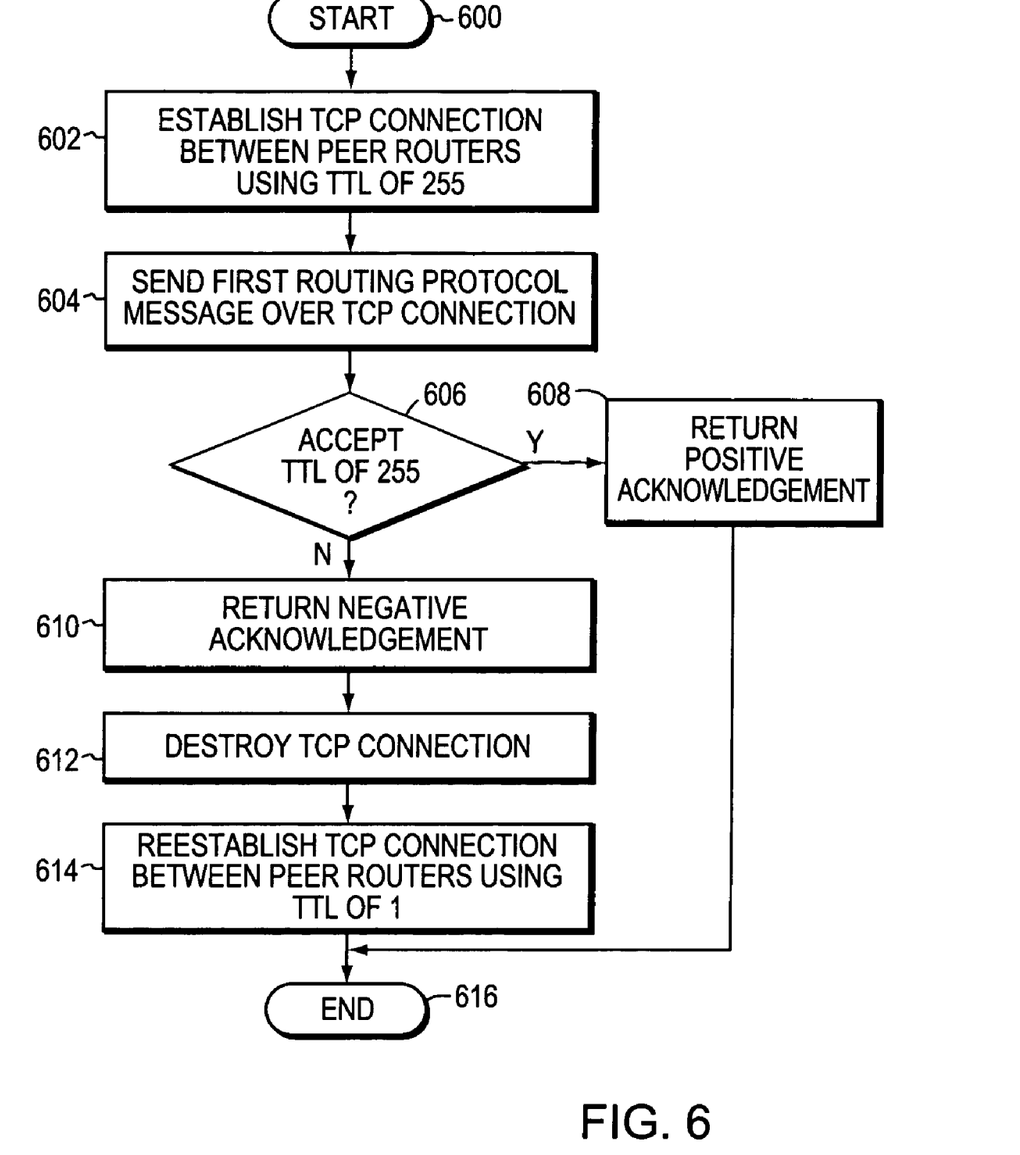
FIG. 6 is a flowchart depicting a sequence of steps for allowing an initiating peer router to efficiently determine capabilities and configuration of a receiving peer router according to the present invention.

FIG. 6 is a flow chart depicting a sequence of steps for allowing an initiating peer router to efficiently determine capabilities and configuration of a receiving peer router according to the illustrative technique. The sequence starts at Step 600 and proceeds to Step 602 where a routing protocol process, such as the BGP process 420, in the initiating peer router instructs the TCP process to establish a TCP connection in accordance with the 3-way handshake arrangement and using a TTL of 255. During session establishment, a first routing protocol message is sent over the TCP connection between the peer routers in Step 604. In Step 606, a determination is made as to whether the receiving peer router supports BTSH (is configured to accept a TTL of 255). Specifically, the BGP peer process in the receiving peer router examines the TTL value of 255 and determines whether it can accept the session. If so, the peer process returns a positive acknowledgement to the initiating peer router in Step 608 and the sequence ends at Step 616.

However, if the receiving peer routing protocol process does not support BTSH and, thus, cannot accept the session, it returns a negative acknowledgement in Step 610. Illustratively, the negative acknowledgement, e.g., a DENY connection error message, is returned to the initiating peer router in response to the first routing protocol message, e.g., a BGP OPEN message. As noted, the OPEN message provides a means for the routers to identify themselves at the beginning of the neighboring peer relationship. In addition, a notification is returned to the initiating router, indicating the reason for denial of the message (i.e., why the session could not be established). The TCP connection is then immediately destroyed in Step 612 and reinitiated (reestablished) using a TTL of 1 in Step 614. The sequence ends at Step 616.

Advantageously, the TTL exploration technique allows BTSH-supported routers to determine whether their peer routers have compatible TTL capabilities "by default", i.e., without negotiation. Otherwise, each router would have to be manually configured to support BTSH on a per-peer, per-routing protocol configuration level. Manual configuration represents significant overhead, requiring consumption of substantial administration time and effort. The present invention avoids such manual configuration and further allows BTSH supported routers to "automatically" interoperate. In addition, the inventive technique obviates any changes, such as state machine changes, to current protocol specification that enable interoperability among peer routers configured for the old and new implementation modes.

While there has been shown and described embodiments that allow a router to efficiently determine capabilities and configuration of a neighbor (peer) router, it is to be understood that various other adaptations and modifications may be made within the spirit and scope of the present invention. For example, although the BTSH implementation described herein is BGP-specific, the novel technique is capable of operating with any routing protocol, such as the Enhanced Interior Gateway Routing Protocol (EIGRP). Typically, EIGRP routers communicate using packets having a TTL of 1; once upgraded with the novel BTSH-supported technique, these EIGRP routers can communicate with packets using a TTL of 255.

The foregoing description has been directed to specific embodiments of this invention. It will be apparent, however, that other variations and modifications may be made to the described embodiments, with the attainment of some or all of their advantages. For instance, it is expressly contemplated that the teachings of this invention, including the various processes described herein, can be implemented as software, including a computer-readable medium having program instructions executing on a computer, hardware, firmware, or a combination thereof. In addition, it is understood that the data structures described herein can include additional information while remaining within the scope of the present invention. Furthermore, the inventive TTL exploration technique may apply to any routing protocol that runs over IP, such as OSPF, since the modification (the TTL field) is in the IP header. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for allowing a router to efficiently determine a time-to-live (TTL) configuration of a peer router in a computer network, the method comprising the steps of:
   automatically determining which TTL mode of operation the peer router supports by sending an initial Border Gateway Protocol (BGP) message from the router to the peer router, the initial BGP message including a first predetermined value of a TTL parameter;
   if the router receives a positive acknowledgement of the initial BGP message from the peer router, determining that the peer router supports exchanges of messages using a new TTL mode of operation; and
   if the router receives a negative acknowledgement of the initial BGP message from the peer router, deciding that the peer router does not support the new TTL mode of operation, and switching to an old TTL mode of operation by resending the initial BGP message with a second predetermined value of the TTL parameter, and subsequently, upgrading the peer router to the new TTL mode of operation, rebooting the peer router, thereby destroying an existing session between the routers, establishing a new session by sending messages with the first predetermined value of the TTL parameter, and communicating between the routers using messages with the first predetermined value of the TTL parameter.

2. The method of claim 1 wherein the step of deciding comprises the step of, if the router does not receive a response at all within a predetermined time, deciding that the peer router does not support the new TTL mode of operation.

3. The method of claim 1 wherein the new TTL mode of operation is defined by BGP TTL Security Hack (BTSH).

4. The method of claim 3 wherein the first predetermined value of the TTL parameter is 255.

5. The method of claim 1 wherein the second predetermined value of the TTL parameter is 1.

6. Apparatus adapted to allow a router to efficiently determine a time-to-live (TTL) configuration of a peer router in a computer network, the apparatus comprising:

means for sending an initial Border Gateway Protocol (BGP) message from the router to the peer router, the initial BGP message including a first predetermined value of a TTL parameter;

means for determining that the peer router supports exchanges of messages using a new TTL mode of operation, if the router receives a positive acknowledgement of the initial BGP message from the peer router;

means for deciding that the peer router does not support the new TTL mode of operation, if the router receives a negative acknowledgement of the initial BGP message from the peer router, and for switching to an old TTL mode of operation by resending the initial BGP message with a second predetermined value of the TTL parameter;

means for upgrading the peer router to the new TTL mode of operation;

means for destroying an existing session between the routers;

means for sending messages with the first predetermined value of the TTL parameter; and means for communicating between the routers using messages with the first predetermined value of the TTL parameter.

7. The apparatus of claim 6 wherein the means for deciding comprises:

means for deciding that the peer router does not support the new TTL mode of operation, if the router does not receive a response at all within a predetermined time.

8. The apparatus of claim 6 wherein the new TTL mode of operation is defined by BGP TTL Security Hack (BTSH).

9. A computer readable storage medium containing executable program instructions for allowing a router to efficiently determine a time-to-live (TTL) configuration of a peer router in a computer network, the executable program instructions comprising program instructions for:

automatically determining which TTL mode of operation the peer router supports by sending an initial Border Gateway Protocol (BGP) message from the router to the peer router, the initial BGP message including a first predetermined value of a TTL parameter;

if the router receives a positive acknowledgement of the initial BGP message from the peer router, determining that the peer router supports exchanges of messages using a new TTL mode of operation; and if the router receives a negative acknowledgement of the initial BGP message from the peer router, deciding that the peer router does not support the new TTL mode of operation, and switching to an old TTL mode of operation by resending the initial BGP message with a second predetermined value of the TTL parameter, and subsequently, upgrading the peer router to the new TTL mode of operation, destroying an existing session between the routers, sending messages with the first predetermined value of the TTL parameter, and communicating between the routers using messages with the first predetermined value of the TTL parameter.

10. The computer readable storage medium of claim 9 wherein the program instruction for deciding comprises one or more program instructions for, if the router does not receive a response at all within a predetermined time, deciding that the peer router does not support the new TTL mode of operation.

11. The computer readable storage medium of claim 9 wherein the new TTL mode of operation is defined by BGP TTL Security Hack (BTSH).

12. A method comprising:

sending an initial message to a peer router before a session is established with the peer router, the initial message including a first predetermined value of a time-to-live (TTL) parameter that makes use of the TTL parameter;

if a positive acknowledgement of the initial message is received from the peer router, determining that the peer router supports exchanges of messages using a new TTL mode of operation; and if a negative acknowledgement of the initial message is received from the peer router, deciding that the peer router does not support the new TTL mode of operation and switching to an old TTL mode of operation by resending the initial message with a second predetermined value of the TTL parameter, and subsequently, upgrading the peer router to the new TLL mode of operation, rebooting the peer router, thereby destroying an existing session between the routers, establishing a new session by sending messages with the first predetermined value of the TTL parameter, and communicating using messages with the first predetermined value of the TTL parameter.

13. The method of claim 12 wherein deciding further comprises, if a response is not received within a predetermined time, deciding that the peer router does not support the new TTL mode of operation.

14. The method of claim 12 wherein the initial message is a Border Gateway Protocol (BGP) routing protocol message.

15. The method of claim 12 wherein the new TTL mode of operation is a BGP TTL Security Hack (BTSH).

* * * * *

UNITED STATES PATENT AND TRADEMARK OFFICE
CERTIFICATE OF CORRECTION

PATENT NO. : 7,634,554 B2  Page 1 of 1
APPLICATION NO. : 10/665805
DATED : December 15, 2009
INVENTOR(S) : David Anthony Cook It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1138 days.

Signed and Sealed this

Twenty-first Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,634,554 B2 | Page 1 of 1 |
| APPLICATION NO. | : 10/665805 | |
| DATED | : December 15, 2009 | |
| INVENTOR(S) | : David Anthony Cook | |

It is certified that error appears in the above-identified patent and that said Letters Patent is hereby corrected as shown below:

Col. 1, Line 33, please amend as shown:

conventional "intra[[-]]domain" routers. Yet is still may be desir- Col. 1, Line 54, please amend as shown:

exchanging routing messages and abstracting the[[ Network]] network Col. 7, Line 34, please amend as shown:

topology. The[[ BGP4]] BGP-4 protocol is illustratively implemented as Col. 8, Line 25, please amend as shown:

connection. The[[ is]] TCP connection is established by con- Signed and Sealed this
Eighth Day of March, 2011

David J. Kappos
*Director of the United States Patent and Trademark Office*